United States Patent [19]

Kadin et al.

[11] Patent Number: 4,771,464

[45] Date of Patent: Sep. 13, 1988

[54] FM STEREOPHONIC BROADCASTING SYSTEM UTILIZING SIMULTANEOUS COMPANDING AND MODULATION/DEMODULATION

[75] Inventors: Jeffrey B. Kadin, Cos Cob; David W. Stebbings, Ridgefield, both of Conn.

[73] Assignee: Broadcast Technology Partners, Bloomfield Hills, Mich.

[21] Appl. No.: 53,492

[22] Filed: May 8, 1987

Related U.S. Application Data

[63] Continuation of Ser. No. 824,050, Jan. 30, 1986, abandoned.

[51] Int. Cl.$^4$ .............................................. H04H 5/00
[52] U.S. Cl. ..................................... 381/13; 381/106; 307/198
[58] Field of Search .................... 381/2, 3, 4, 13, 106; 307/498

[56] References Cited

U.S. PATENT DOCUMENTS

| | | | |
|---|---|---|---|
| 3,484,595 | 12/1969 | Krips ................................. | 307/498 |
| 4,194,161 | 3/1980 | Hershberger ......................... | 381/7 |
| 4,376,916 | 3/1983 | Glaberson .......................... | 330/136 |
| 4,485,483 | 11/1984 | Torick et al. ....................... | 381/14 |
| 4,523,329 | 6/1985 | Ishida et al. ....................... | 381/3 |
| 4,602,380 | 7/1986 | Stebbings .......................... | 381/13 |
| 4,602,381 | 7/1986 | Cugnini et al. ..................... | 381/13 |

OTHER PUBLICATIONS

"Application of the Two-Quadrant Transconductance Amplifier/Multiplier in Audio Signal Processing" by Walter Jung, presented at Sep. 11, 1974 convention of AES.

Primary Examiner—Forester W. Isen
Attorney, Agent, or Firm—Spencer E. Olson

[57] ABSTRACT

An FM stereophonic broadcasting system incorporating companding of the difference signal in which the broadcast signal includes both the usual difference signal and a compressed version of the difference signal which utilizes, in the transmitter, a circuit for simultaneously compressing the difference signal according to a desired characteristic and modulating the compressed difference signal onto a carrier and, in the receiver, essentially the same circuit for simultaneously demodulating and expanding an incoming compressed difference signal. Simultaneous compression/modulation is achieved by multiplying the difference signal, the carrier signal and a gain control signal, preferably derived from the output signal from the multiplier, for determining the compression characteristic, thereby producing at the output of the multiplier the carrier modulated with the difference signal compressed according to a desired characteristic. Simultaneous demodulation and expansion of a received signal is achieved by multiplying the received signal, a reference carrier signal and a gain control signal, also preferably derived from the output of the multiplier, for determining the expansion characteristic, thereby producing as the multiplier output the difference signal expanded according to the desired characteristic. Expansion may be, and preferably is, controlled by the received usual difference signal so as to be adaptive to any compression characteristic that might be employed at the transmitter.

27 Claims, 7 Drawing Sheets

FM STEREOPHONIC BROADCASTING SYSTEM UTILIZING SIMULTANEOUS COMPANDING AND MODULATION/DEMODULATION

This is a continuation of co-pending application Ser. No. 824,050, filed on 1/30/86, now abandoned.

BACKGROUND OF THE INVENTION

This invention relates to FM stereophonic broadcasting systems and, more particularly, to an improved FM stereophonic broadcasting system utilizing companding of the difference signal and simultaneous companding and modulation/demodulation techniques.

U.S. Pat. No. 4,485,483 of Emil L. Torick and Thomas B. Keller, the disclosure of which is hereby incorporated herein by reference, describes an FM stereophonic broadcasting system in which the usual left and right signals are conventionally matrixed to obtain conventional sum (M) and difference (S) signals, and the difference signal is used to amplitude-modulate a first sub-carrier signal and is also applied to a compressor which compresses its dynamic range in accordance with a given law to produce a compressed difference signal S'. The compressed difference signal S' amplitude-modulates a second sub-carrier signal, preferably of the same frequency but in quadrature phase relationship with the first. The M signal, the two modulated sub-carrier signals, and a pilot are then frequency modulated onto a high frequency carrier for transmission purposes. The receiver includes a demodulator for deriving the M signal, the normal difference signal S and the compressed difference signal S', and an expander for complementarily expanding the derived compressed difference signal. The expanded noise-reduced version of the difference signal is combined with the derived sum signal M to obtain the original left (L) and right (R) signals. Companding of the difference signal S gives 22 db to 26 db signal-to-noise improvement in the transmission thereby to greatly extend the effective stereo service area over that of the existing FM stereo service.

Commonly assigned U.S. patent application Ser. No. 688,940 filed Jan. 4, 1985, by applicant David W. Stebbings, now U.S. Pat. No. 4,602,380 the disclosure of which is hereby incorporated herein by reference, discloses an improvement of the above-described Torick/Keller system in that unlike the Torick/Keller system, in which only the expanded version of the received compressed difference signal is matrixed with the sum signal M to obtain the original L and R signals, the receiver matrixes a noise-reduced difference signal, derived by combining and expanding the received difference signals S and S', with the derived signal M to obtain the original L and R signals. Since the signal content of the signals S and S' is the same, by combining them the effective level of the received difference signal is increased by about 6 db, whereas the noise is increased by only about 3 db, resulting in a net improvement in signal-to-noise ratio of about 3 db over that of the Torick/Keller system. The transmission of the uncompressed difference signal S (necessary for compatibility with existing systems), coupled with the utilization at the receiver of both the uncompressed and compressed difference signals, allows the use of any desired companding law for the compression of the difference signal.

Commonly assigned U.S. patent application Ser. No. 688,854, also filed Jan. 4, 1985, by Aldo G. Cugnini, Daniel W. Gravereaux and applicant David W. Stebbings, now U.S. Pat. No. 4,602,381 the disclosure of which is also hereby incorporated herein by reference, describes an FM stereophonic broadcasting system which utilizes the Torick/Keller concept of transmitting both the usual difference signal S and a compressed difference signal S' and the Stebbings concept of combining the usual difference signal and the expanded version of the compressed difference signal at the receiver to achieve greater noise reduction and improved signal-to-noise ratio, and additionally uses the normal difference signal at the receiver as a reference signal for controlling the expander so as to cause the amplitude of the companded difference signal to equal the level of the normal difference signal and thus insure proper dematrixing with the received sum signal M. The latter feature has the important advantage that the expander is adaptive to any compressor characteristic that might be employed at the transmitter. Further, the uncompressed difference signal available at the receiver enables adaptive decoding of dynamic parameters of the received signal, such as frequency response and attack and recovery time constants, so that all of the parameters of the original signal can be substantially restored, automatically, whatever the transmission system used.

In order that the adaptive expander system described in the aforementioned application Ser. No. 688,854 realize the maximum benefit from the availability at the receiver of both the unchanged and compressed difference signals S and S' it was necessary to use a stereo decoder (or demultiplexer), often in integrated circuit form, modified to give access to both the S and S' signals in quadrature. More particularly, in the prior system, these signals and decoded from the 38 KHz carrier to derive the corresponding baseband audio difference signals, both unchanged (S) and compressed (S'). The expander, which in a preferred embodiment is adaptive in nature, operates on the demodulated S and S' signals, with the S signal utilized as a reference for controlling the expansion. Thus, the decoder IC requires an extra demodulator as compared to the conventional FM stereo receiver, and also a second reference 38 KHz carrier, either in quadrature or at 45° for driving the extra demodulator, as well as other matrices and components for effecting demodulation and expansion of the compressed difference signal. These additional components represent an increase in complexity and cost over that of conventional FM stereo receivers, and in order for the improved system to be more readily accepted these added costs are desirably reduced to more nearly correspond to the cost of conventional receivers.

Accordingly, it is a primary object of the present invention to provide an FM stereophonic broadcasting system utilizing companding of the difference signal which is simpler and less costly than the systems described in the aforementioned copending patent applications.

Another object of the invention is to provide an improved companding system having lower distortion level, and less control signal breakthrough to the audio output.

Yet another object of the invention is to provide in an FM stereophonic receiver for a system utilizing companding of the difference signal in which simultaneous demodulation and expansion of the difference signal is combined with the simultaneous demodulation of the FM signal directly at the output of the FM limiter of the receiver.

A more specific object of the invention is to provide a technique for simultaneously modulating an audio signal onto a reference carrier and compressing the signal, or for simultaneously demodulating and expanding such compressed signal.

SUMMARY OF THE INVENTION

Briefly, the present invention, which has particular utility in the FM stereophonic broadcasting systems described in the aforementioned patent and patent applications, resides in the companson of the stereo difference signal after it has been modulated onto the 38 KHz carrier, in contrast to the previous technique of performing compression and expansion on the baseband signals. In accordance with the invention, both compression and expansion, including adaptive expansion, is performed on the carrier signal, thereby saving components; for example, an adaptive expander and a "stereo decoder" can be combined in one integrated circuit chip. This advantageous result is achieved by combining the function of the multiplying demodulator used to recover the baseband audio signal with the function of the variable gain amplifier (VGA) used in baseband companders so as to simultaneously achieve the demodulating and gain varying functions in the same multiplier. This means that a separate VGA is not required in either the compressor or the expander, with a resulting saving of components. Simultaneous modulation/compression or simultaneous demodulation/expansion is achieved with a multiplier having three input ports and one output port, two input ports of which are connected to respectively receive the reference carrier and the modulating signal in the case of the compressor, or the reference carrier and the modulated, compressed stereo difference signal in the case of an expander, with the third input port connected to receive a gain control signal for determining the compression or expansion characteristic, as the case may be.

According to another feature of the invention, simultaneous demodulation of the FM signal directly at the output of the FM limiter together with the simultaneous demodulation of the stereo difference signal is achieved with a multiplier having four input ports for multiplying the output of the limiter, the output of the limiter shifted in phase by 90° at its center frequency, a reference 38 KHz subcarrier signal and a gain control signal derived from the output of the multiplier for determining the expansion characteristics.

BRIEF DESCRIPTION OF THE DRAWINGS

Other objects, features, and advantages of the invention, and a better understanding of its construction and operation, will be had from the following detailed description, when considered in conjunction with the accompanying drawings, in which.

DETAILED DESCRIPTION OF PREFERRED EMBODIMENTS

Figure 1:
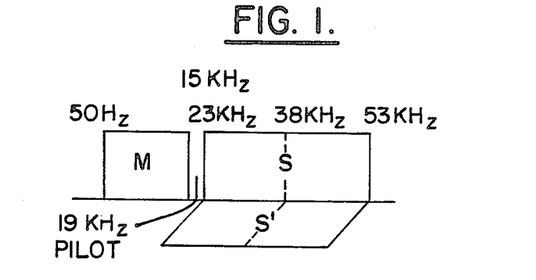
FIG. 1 is a frequency diagram of the composite baseband signal utilized in an FM stereo broadcasting system in which the invention has utility.

The present invention will be described in the context of the FM stereophonic broadcasting system described in the aforementioned Torick/Keller patent in the transmitter of which a compressed difference signal (hereinafter designated S') is added to the conventional composite FM signal utilized in the existing two-channel stereo system approved by the FCC. The compressed difference signal is conveniently transmitted as a double-sideband suppressed 38 KHz quadrature sub-carrier signal S' cos ωt. As is evident from the frequency spectrum of the composite signal illustrated in FIG. 1, the quadrature sub-carrier requires no additional spectrum space and because of the adaptive quality of the expander utilized in the receiver (to be described) imposes no penalty in modulation potential.

Figure 2:
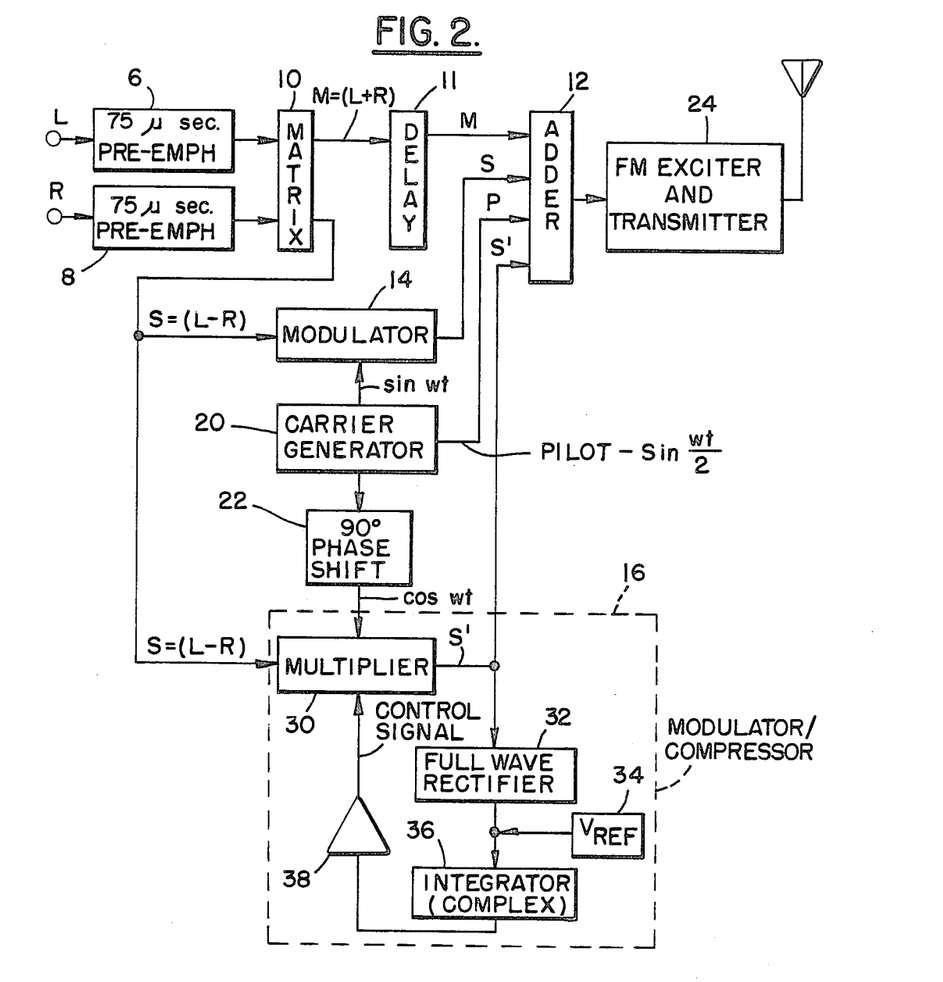
FIG. 2 is a simplified block diagram of a transmitting terminal for generating and transmitting the composite signal of FIG. 1.

A transmitter for generating this composite signal is illustrated in FIG. 2 which, in the interest of simplification, omits some of the more conventional transmitter circuits. Two audio frequency signals L and R, derived from a stereo source (not shown), are applied via usual 75 μsec pre-emphasis networks 6 and 8, respectively, to the inputs of a conventional matrix network 10 which may, for example, consist of a network of summing amplifiers arranged to produce the two audio output signals M=(L+R) and S=(L−R). The monophonic sum signal M is applied via a delay device 11 to one input of an adder 12, and the stereophonic difference signal S is applied to the input of a modulator 14, and also to the input of a combined modulator/compressor 16 in which the present invention is embodied. The delay introduced by delay device 11 is such as to insure that the M signal and the two modulated signals arrive at the adder simultaneously.

A carrier generator 20 produces a 38 KHz sine-wave signal which is applied to modulator 14 and also to a phase-shift network 22 of known construction for providing a 90° phase displacement between the sub-carrier signal applied to modulator 14 and the sub-carrier applied to modulator/compressor 16. Modulator 14 is a suppressed-carrier amplitude-modulator of known construction and serves to amplitude-modulate the sub-carrier with the difference signal S so as to produce at its output a double-sideband, suppressed-carrier, amplitude-modulated sub-carrier signal S sin t. This signal is combined in adder 12 with the sum signal M and a 19 KHz sinewave pilot signal, also derived from carrier generator 20, and a second double-sideband, suppressed-carrier, amplitude modulated sub-carrier signal S' cos ωt delivered by modulator/compressor 16, the operation of which will be described shortly. The composite signal appearing at the output of adder 12 is then applied to the FM exciter of a transmitter 24 and frequency modulated onto a high frequency carrier for transmission to one or more remote receivers.

In contrast to the transmitter shown in U.S. Pat. No. 4,602,381 wherein the baseband difference signal S is compressed to produce the compressed difference signal S' and the compressed signal used to modulate the quadrature-related sub-carrier, in the present system the difference signal S is applied as one input to a balanced three-port multiplier 30 and the quadrature sub-carrier cos t is applied to a second port. A control signal proportional in amplitude to the output of the multiplier is applied to the third port to give the multiplier the properties of a variable gain device, so that modulation of the sub-carrier and compression of the difference signal S occurs simultaneously. In the illustrated feedback type of compressor the multiplier gain is controlled by a direct voltage derived from the output signal of the multiplier, designated S', and which is a function of the amplitude of the difference signal (L−R). This output signal is fed to a control voltage generator circuit which includes a full-wave rectifier 32 for producing a direct voltage signal having a level proportional to the amplitude of the alternating compressed signal S' cos ωt. The control loop further includes a settable voltage reference device 34, which may be incorporated as part of the rectifier or, alternatively, may be inserted at some other point in the loop, for determining the "knee" of the compression characteristic. The direct voltage output from rectifier 32 is proportional to the amplitude of signal S' cos ωt when the latter exceeds the threshold level $V_{ref}$, and is equal to the threshold voltage when the amplitude of signal S' cos ωt is less than the threshold, so that input signals having amplitudes above the threshold are compressed and signals having amplitudes below the threshold are not compressed and have a preset gain greater than unity, for example 10 dB to 26 dB. The direct voltage produced by rectifier 32 and threshold device 34 is applied to an integrator 36 which preferably is of the complex form described in commonly assigned U.S. Pat. No. 4,376,916, which includes a network of at least three signal paths having differing time constants, the network having a common input terminal for receiving the rectified signal and a common output terminal at which the control signal is developed. All except one of the signal paths each includes a diode for causing the respective path to be conductive only in response to the rectified signal exhibiting a change in amplitude sufficient to exceed a predetermined voltage, and the said one signal path conducts in response to any differential in voltage between the input and output terminals. The output signal from integrator 36 is amplified by a suitable amplifier 38 and applied as a control signal to the third port of multiplier 30. The control signal delivered by the described network causes the output signal delivered by multiplier 30 to not noticeably modify the information content of the source signal.

Figure 3:
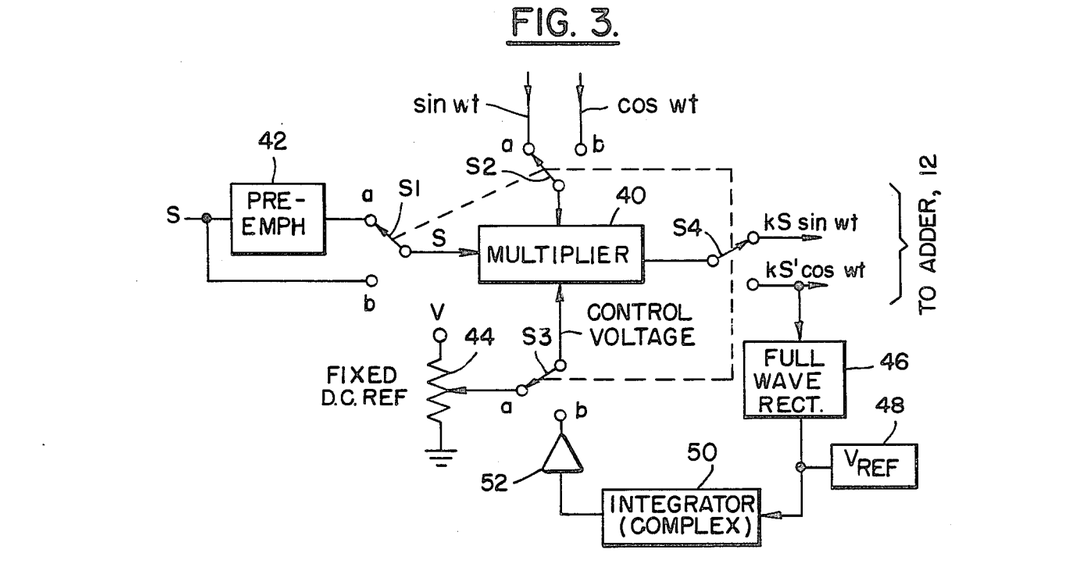
FIG. 3 is a simplified block diagram of an alternative form of a modulator/compressor useful in the system of FIG. 2.

FIG. 3 is a block diagram of an alternative form of modulator/compressor useful in the system of FIG. 2 which through the use of only one three-port multiplier 40 which is time division multiplexed by ganged switches S1, S2, S3 and S4 each having a pair of contacts (a) and (b), the modulation of the normal difference signal S (i.e., the function of modulator 14 in FIG. 2) and the modulation and compression of the difference signal is accomplished simultaneously in a relatively simple integratable circuit. Although in the interest of clarity of understanding of the operation of the circuit, the switches are depicted as mechanical single pole-double throw switches, in an actual embodiment they would be electronic switches under common clock control to be switched at a rate at least twice, and preferably higher, the highest audio frequency likely to be encountered; a switching frequency of the order of 114 KHz, or three times the 38 KHz subcarrier frequency, is acceptable. With the contactors of all of the switches connected to their respective (a) contacts as shown, the condition in which the circuit performs the function of amplitude modulating the difference signal S (that is, the function of modulator 14 in FIG. 2), the 38 KHz carrier sin ωt from carrier generator 20 is applied to one port of multiplier 40, the difference signal S after pre-emphasis, if necessary, by pre-emphasis circuit 42, is applied to a second port, and a fixed D.C. reference voltage derived from a potentiometer 44 connected to a suitable source of potential is applied to the third port so as to fix the gain at a prescribed point; the multiplier functions to amplitude modulate the reference carrier with the difference signal and produces at the output terminal the signal kS sin ωt for application to adder 12.

When all of the switch contactors are switched to the (b) contacts, the circuit corresponds to the configuration within the dashed-line enclosure 16 of FIG. 2 so as to simultaneously compress the difference signal and amplitude modulate a sub-carrier with the compressed difference signal and to produce at the output of multiplier 40 an amplitude-modulated signal kS' cos ωt for application to the adder 12. More particularly, with the switches in the (b) position the difference signal S, without pre-emphasis, is applied to one port, the quadrature 38 KHz sub-carrier from phase shift network 22 is applied to a second port, and a control voltage derived from the signal appearing at the output of the multiplier is applied to the third port for controlling the gain of the multiplier according to a desired compression characteristic. As in the circuit shown in FIG. 2, the output signal from the multiplier is fed to a control voltage generator circuit which includes a full-wave rectifier 46 for producing a direct voltage signal having a level proportional to the amplitude of the signal kS' cos ωt. The control loop further includes a settable voltage reference device 48, which may either be incorporated as part of the rectifier or inserted at some other point in the loop, for determining the knee of the compression characteristic. The direct voltage output from rectifier 46 as modified by the reference voltage is proportional to the amplitude of the signal S' when the latter exceeds the threshold level $V_{ref}$, and is equal to the threshold when the amplitude of the signal S' is less than the threshold, so that input signals having amplitudes above the threshold are compressed and signals having amplitudes below the threshold are not compressed. The direct voltage produced by rectifier 46 and the reference voltage device 48 is integrated in a suitable complex integrator 50 of the kind described earlier and then amplified by an amplifier 52 and applied as a control signal to the third input port of multiplier 40.

Thus, all modulation and compression of the stereo difference signal necessary for realizing the benefits of the Torick/Keller broadcasting system is accomplished with only one three-port multiplier, thus effecting a large saving in components compared to prior art stereo generators, as well as at lower levels of distortion. With the possible exception of the potentiometer 44 and the pre-emphasis device 42, the circuit of FIG. 3, including the switches, is amenable to integration, thereby making it possible to provide the total modulation/compression function in a single integrated circuit chip.

The parameters of the control signal generating loop may be selected to give the compressor any of several known companding laws, four of which are disclosed in the aforementioned U.S. Pat. No. 4,602,380. For example, the compressor may have the infinity-to-one compression characteristic illustrated in the signal level diagram of FIG. 4, wherein the input signals to be processed for compression are represented along the abscissa between −60 dB and a standard operating level of 0 dB. The absolute value of the input voltage rises along the abscissa from left to right up to the rated level. The output levels for compression or expansion are represented along the ordinate between −60 dB and 0 dB. The absolute value of the output voltage rises along the ordinate, from the bottom to the top, up to the rated level. Curve 60 represents the relation between the output and input levels of the normal difference signal S which, since it is transmitted unchanged (i.e., not subjected to compression) has a gain slope of one. Curve 62 represents the relationship between the input and output signal levels of the compressor and shows that for input signal levels in the range between −60 dB and about −32 dB the characteristic has a slope of one; thus, input signal levels lower than about −32 dB relative to the rated level are not compressed but receive a fixed gain of about 26 dB. For input levels higher than about −32 dB, the characteristic has a compression slope of infinity; that is, beginning at the knee 64 of the characteristic, in this example set at −32 dB, the output level is the same regardless of the level of the input signal, which in this example is at a level of −6.7 dB relative to the rated level. Thus it is seen that the dynamic range of input signals between −60 dB and −32 dB has been reduced to a range between −40 dB and −6.7 dB for the output signals, and that for input signal levels greater than about −32 dB the output level remains constant at −6.7 dB. The vertically oriented arrow 66 extending between the characteristic 60 for the S signal and the compressor characteristic 62 represents the approximately 26 dB gain increase in the difference signal S' as compared to the difference signal S required to compensate for the noise penalty for stereophonic programming relative to monophonic.

Figure 4:
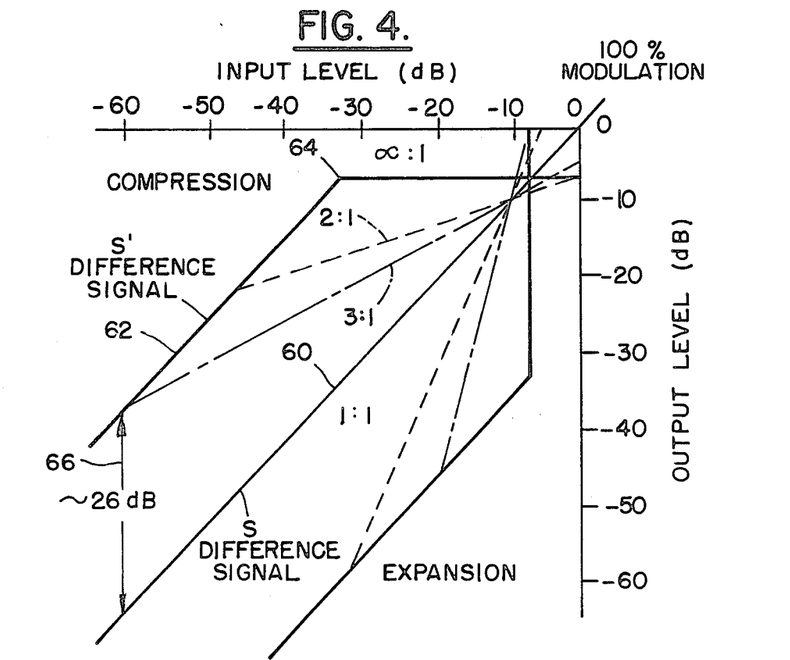
FIG. 4 shows the steady state compression and expansion characteristics of three different companding laws useful in the system.

The infinity-to-one compression law for the difference signal is preferable to the 2:1 or the 3:1 compression characteristics, also shown in FIG. 4, typically employed in the "CX" companding system described in U.S. Pat. No. 4,376,916, especially in the respect that it gives a significant relative improvement against program modulated noise.

Figure 5:
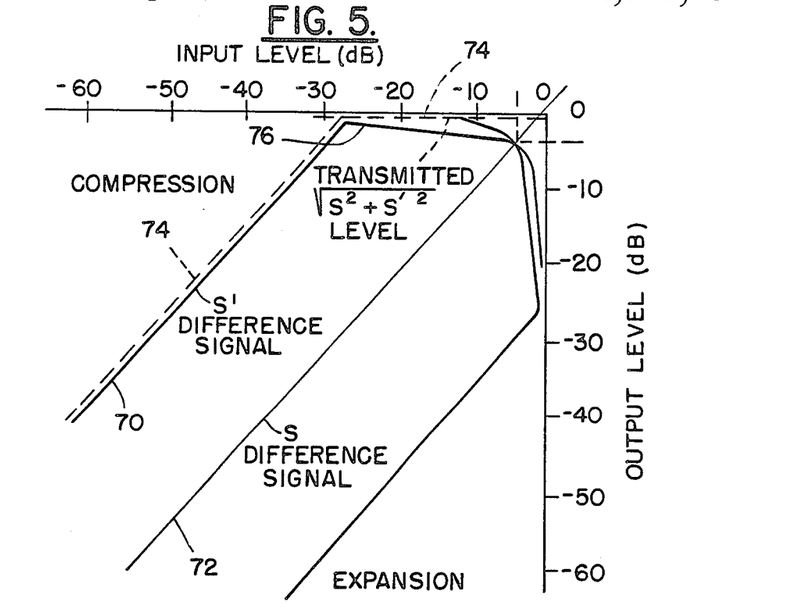
FIG. 5 shows the steady state compression and expansion characteristics of another companding law useful in the system.

As another example, the compressor may be designed to have the compression characteristic 70 shown in the signal level diagram of FIG. 5, which extends with unity slope up to within a dB or two of 100% modulation and then gradually drops back from that level as the level of the difference signal (represented by curve 72 having a slope of one) rises such that addition of the S and S' signals gives an infinity-to-one characteristic (depicted by dotted line characteristic 74) that is always maintained within a small fraction of a dB of 100% modulation. The re-entrant characteristic of the curve 76 can be quite easily derived by subtracting the difference signal S from the output of a regular infinity-to-one compressor having the characteristic illustrated in FIG. 4. This re-entrant characteristic not only permits maximum possible modulation of the sub-carrier signal, it also insures that the sub-carrier is maintained at substantially constant amplitude over a wide dynamic range of program level, making it possible to transmit at 100% modulation all of the time, which assures the best possible S/N condition at the receiver.

FIGS. 4 and 5 illustrate but four examples of compressor characteristics to which the expander (to be described) is capable of adapting to produce a noise-reduced expanded difference signal at the receiver. Another example is the compression characteristic of the dbx Inc. compander that has been adopted as the standard in the Electronic Industries Association system for stereo television. Whatever compression characteristic is utilized, the difference signal (L−R) is used, unchanged, to amplitude-modulate one sub-carrier signal and the same difference signal, but compressed according to the desired characteristic, is used to amplitude-modulate a quadrature sub-carrier, and then both are frequency modulated onto a high frequency carrier for transmission.

To applicant's knowledge, three- or multi-port multipliers are not currently available in chip form; however, there are several possible configurations of known two-quadrant transconductance amplifiers/multipliers capable of performing the described functions, which will now be described with reference to FIGS. 6A through 6D.

Figure 6A:
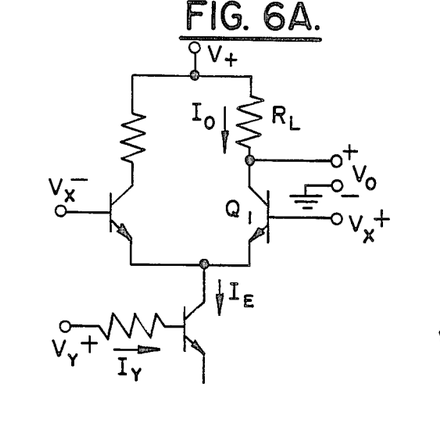
FIGS. 6A through 6D are circuit diagrams of multiport multipliers suitable for use in the practice of the invention.
Figures 6B, 6D:
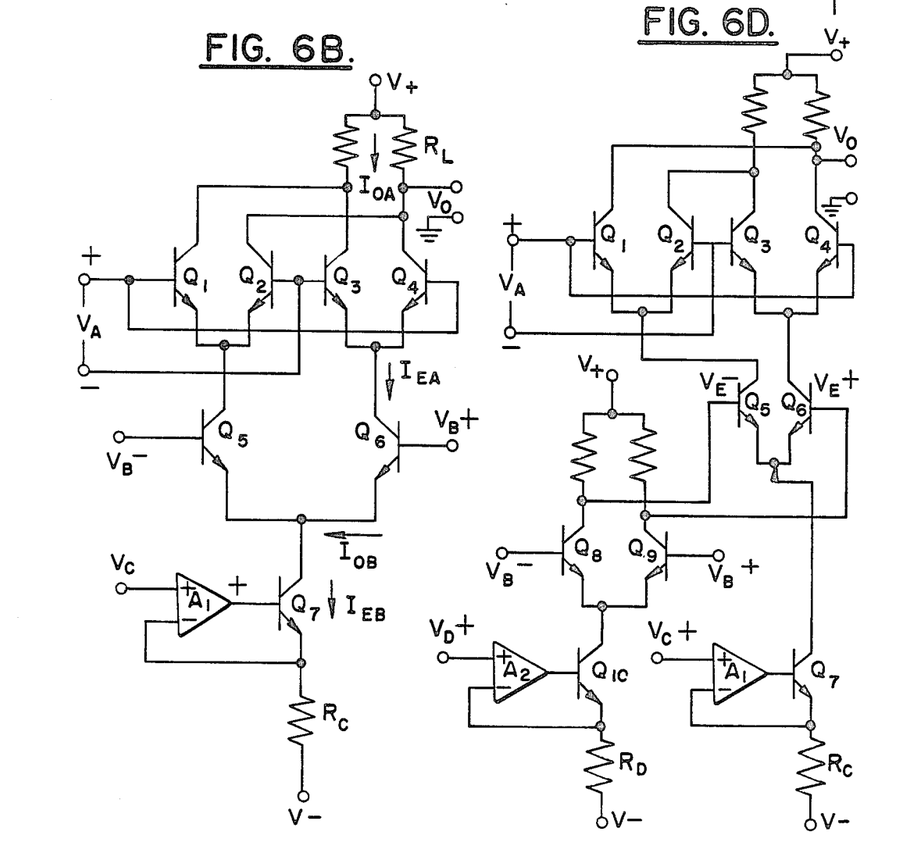

It is well known, for example, from a paper entitled "Application of the Two-Quadrant Transconductance Amplifier/Multiplier in Audio Signal Processing" presented Sept. 11, 1974 at the 49th Convention of the Audio Engineering Society by Walter Jung of AAI Corporation, that the small signal gain of a two-port multiplier as shown in FIG. 6A is $$A_V = I_E R_L \frac{q}{4KT}$$

where $I_E$ is the emitter current of the transistor $Q_1$, $R_L$ is the collector load resistance $R_L$, K=Boltzman's constant, T=absolute temperature, in °K., and q=electron charge. At room temperature (300° K.), KT/q is approximately equal to 26 mV. Since $A_V = V_o/V_{in}$ and $V_o = I_o R_L$, the basic gain equation can be rewritten as $$I_o = I_E V_{in} K_1 \qquad \text{Equation (1)}$$

where $I_o$ is the current through the load resistor $R_L$ and $K_1 = q/4KT$. Using the transfer Equation (1), a three-port multiplier will now be described with reference to FIG. 6B.

In the circuit of FIG. 6B, $Q_1$ and $Q_2$, $Q_3$ and $Q_4$ and $Q_5$ and $Q_6$ are matched transistors which in their static condition split their respective emitter currents equally. A first bipolar input signal $V_A$ is applied between the bases of transistors $Q_1$, $Q_4$ and transistors $Q_2$, $Q_3$, and a second bipolar input signal is applied between the bases of transistors $Q_5$ and $Q_6$. The collectors of transistors $Q_1$ and $Q_2$ are respectively connected to the collectors of $Q_3$ and $Q_4$; the connected emitters of transistors $Q_1$ and $Q_2$ are connected to the collector of transistor $Q_5$; the connected emitters of transistors $Q_3$ and $Q_4$ are connected to the collector of transistor $Q_6$; and the connected emitters of transistors $Q_5$ and $Q_6$ are connected to the collector of a seventh transistor $Q_7$, the emitter of which is connected via a resistor $R_c$ to a negative potential source. Transistor $Q_7$ has an operation amplifier $A_1$ differential input stage; a third input signal $V_C$ is applied to the positive input terminal of amplifier $A_1$, and the amplifier, transistor $Q_7$ and resistor $R_c$ constitute a voltage controlled current source with the transfer characteristic $V_c/R_c=I_{EB}$ (the emitter current of either of transistors $Q_5$ or $Q_6$). This can be rewritten as $$I_{EB}=V_c K_2 \qquad \text{Equation (2)}$$

where $K_2=1/R_c$. Substituting $I_{EB}$ in Equation (1), the output current $I_{OB}$ of transistor $Q_6$ may be written as $$I_{OB}=I_{EB}V_B K_1 \qquad \text{Equation (3)}$$

Since $I_{OB}$ equals the emitter current $I_{EA}$ and again substituting into Equation (1), the output current $I_{OA}$ at the collector of transistor $Q_4$ may be written $$I_{OA}=I_{EA}\times V_A\times K_1 \qquad \text{Equation (4)}$$

Substituting $I_{OB}$ from Equation (3) for $I_{EA}$ in Equation 4, $$I_{OA}=I_{EB}\times V_B\times K_1\times V_A\times K_1 \qquad \text{Equation (5)}$$

Substituting $I_{EB}$ from Equation (2) in Equation (5), $$I_{OA}=V_c\times K_2\times V_B\times K_1\times V_A\times K_1 \qquad \text{Equation (6)}$$

and rearranging Equation (6), $$I_{OA}=V_A\times V_B\times V_C\times K_3 \qquad \text{Equation (7)}$$

where $K_3=K_2\times K_1\times K_1$, showing that the voltage $V_o$ at the output port is a function of the multiplication of the three independent input voltages $V_A$, $V_B$ and $V_C$.

As in all differential multipliers, the output is linear only for small input voltages due to the exponential $V_{in}$-$V_{out}$ characteristic. This can be overcome by using the well known technique of predistorting the base voltages $V_A$ and $V_B$ using the circuit shown in FIG. 6C. In this circuit the matched transistor pair (one of which is shown as $Q_5$ by way of example) receive a distorted signal $V'_{in}$ derived from the input $V_{in}$. The $V_{in}$ voltage is processed in log form to satisfy the requirements for linear output current from the matched transistors, this being accomplished by the matched bridge of diodes D1, D2, D3 and D4. Diodes D1–D4 are biased by resistors R1 and R2 with a static dc current, and in conjunction with a resistor R3 forms an input attenuation network. Resistor R3 also acts as a current source counteracting the non-linear diode impedance on the current flowing through the resistor. Thus, the current in resistor R3 and the bridge is linear while the voltage developed at the bridge and applied to the base of transistor $Q_5$ is logarithmic. The described circuit not only compensates for the non-linearities in the differential multiplier but gain variations due to temperature are also cancelled by changes in the bridge impedance due to temperature.

Figure 6C:
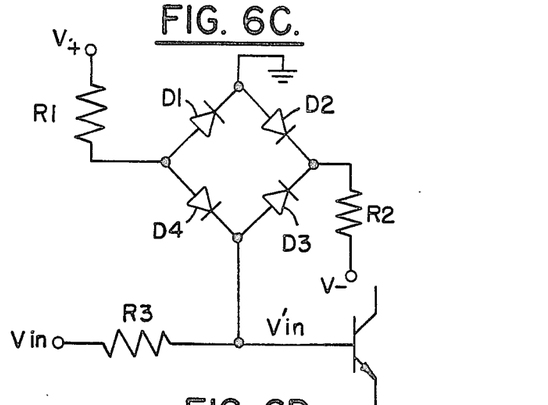

As shown in FIG. 6D, additional ports can be added to the circuit of FIG. 6C by feeding any one of the differential ports with the output of another differential multiplier. As in the FIG. 6C circuit, a first input signal $V_A$ is applied between the bases of transistors $Q_1$, $Q_4$ and transistors $Q_2$, $Q_3$, and the connected emitters of transistor pair $Q_1$, $Q_2$ and transistor pair $Q_3$, $Q_4$ are connected to the collectors of transistors $Q_5$ and $Q_6$, respectively, which constitute another matched pair. Unlike the circuit of FIG. 6C in which a second input voltage is applied to the bases of transistors $Q_5$ and $Q_6$, a bipolar signal $V_E$, which is the output of another differential multiplier comprising matched transistors $Q_8$ and $Q_9$, is applied across them; a second input signal $V_B$ is applied across the bases of transistors $Q_8$ and $Q_9$. The connected emitters of transistors $Q_5$ and $Q_6$ are connected to the collector of transistor $Q_7$ which, in combination with an operational amplifier A, and a resistor $R_c$ constitute a current source controllable by a third input voltage $V_c$ applied to the positive input of the amplifier, and the connected emitters of transistors $Q_8$ and $Q_9$ are connected to the collector of a transistor $Q_{10}$ which, together with an operational amplifier $A_2$ and resistor $R_D$ make up a current source controllable by a fourth input voltage $V_D$ applied to the positive input of the amplifier. Applying the calculations used in explaining the operation of the FIG. 6C circuit, it will be seen that the voltage $V_o$ produced at the output port is a function of the multiplication of the four independent input voltages $V_A$, $V_B$, $V_C$ and $V_D$, which may be expressed as $$V_O=V_A\times V_B\times V_C\times V_D\times K \qquad \text{Equation (8)}$$

Figure 7:
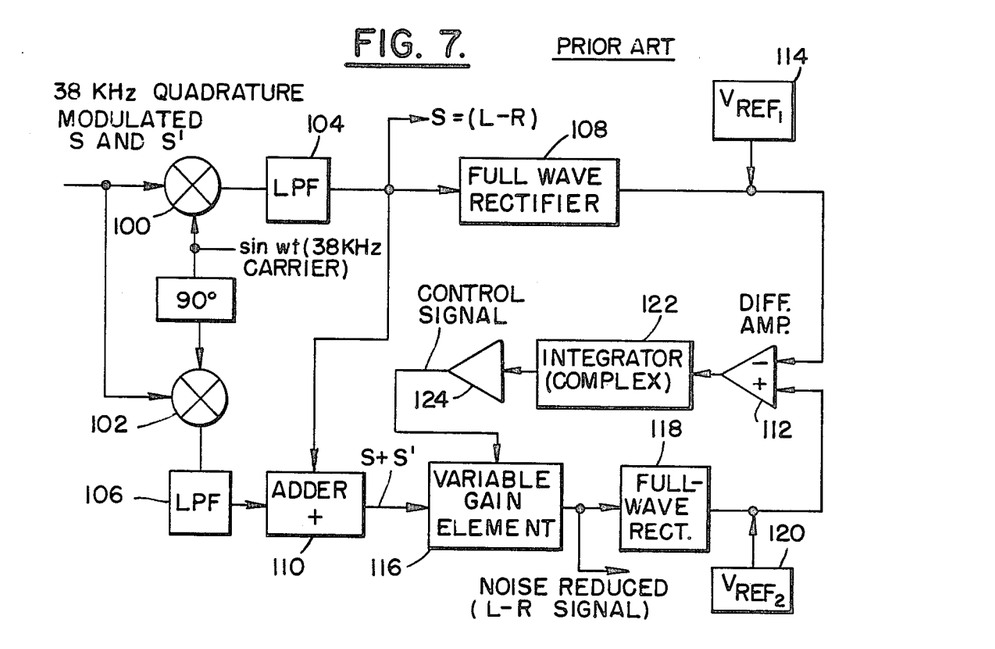
FIG. 7 is a simplified block diagram of one embodiment of adaptive expander described in patent No. 4,602,381.

The principles of the invention are equally applicable and advantageous in the demodulation and expansion of the difference signal at the receiver, and is particularly useful in the implementation of the adaptive expanders described in U.S. Pat. No. 4,602,381. To provide a basis for comparison with an expander constructed in accordance with the present invention, FIG. 7 illustrates in block diagram form the demodulators and one of the adaptive expanders described in detail in the aforementioned application. After detection by known FM detection means (not shown), the quadrature-related 38 KHZ sub-carriers respectively amplitude modulated with S and S' are selected by bandpass filtering and applied to demodulators 100 and 102, which may take the form of conventional multipliers having two input ports. The pilot signal is derived by known means (not shown) and used to regenerate and apply quadrature versions of the 38 KHz carrier to the second port of a respective modulator, that is, sin $\omega t$ to multiplier 100 and cos $\omega t$ to multiplier 102. The resulting output signals from multipliers 100 and 102 are applied to respective low pass filters 104 and 106 to remove residual carrier and modulation components and obtain the baseband signals S and S' (which has the function of (L-R) established by the compressor at the transmitter), respectively.

The availability of both the usual difference signal S and the compressed version thereof enables the illustrated expander to adapt to the compression characteristic whatever its form, by using the difference signal S as a reference level for developing a control signal for a variable gain element connected to receive the compressed difference signal S' and for producing a noise-reduced difference signal. To this end, the uncompressed difference signal S is applied to a first full-wave rectifier 108 and also as one input to an adder 110 which adds it to the compressed difference signal S'. The direct current signal from rectifier 108, which has a level proportional to the amplitude of the difference signal S, is applied to one input of a comparator, such as a difference amplifier 112. A settable reference voltage level for this loop is established by a device 114 labelled $V_{ref.1}$, which element may be embodied in the circuit of rectifier 108, and the purpose of which will be described presently. The signal from adder 110, representing the sum of signals S and S', is applied to the input of a variable gain element 116, the output of which is applied to a second full-wave rectifier 118 which produces a direct current output signal having a level proportional to the amplitude of the output signal from variable gain element 116. This direct current signal is applied to the other input of difference amplifier 112. A second voltage reference device 120, designated $V_{ref.2}$, establishes a reference voltage level for this loop. Any output signal from comparator 112 representing a difference in the amplitude of the two applied signals (after taking into account the reference voltage levels established by elements 114 and 120) is applied to an integrator 122, preferably of the complex type described earlier. The output signal from integrator 122 is amplified by a suitable amplifier 124 to produce a signal for controlling the gain of variable gain element 116. The function of the difference amplifier 112 is analogous to that of the threshold level of conventional expanders in that no change is made to the voltage level determined by the unchanged difference signal S until the signal level is above the "knee" of the transfer characteristic. Voltage reference $V_{ref.1}$ is provided to limit the lower "knee" of the expander, and $V_{ref.2}$ is provided to cut off its associated loop, because otherwise the loop gain would try to make the output of variable gain element 116 constant at the level of the uncompressed difference signal S. The level of the signal S appearing at the output of variable gain element 116 is set by reference voltage device 120 and amplifier 124 to be equal to the level of the usual difference signal S; using that signal as a reference level gives the expander the capability of adapting to any of a wide variety of companding laws. In other words, because the operation of the expander depends only on the level of the unchanged difference signal S, any type of compression law currently available, or as may be developed in the future, would be satisfactorily decoded by the adaptive system of FIG. 7.

Figure 8:
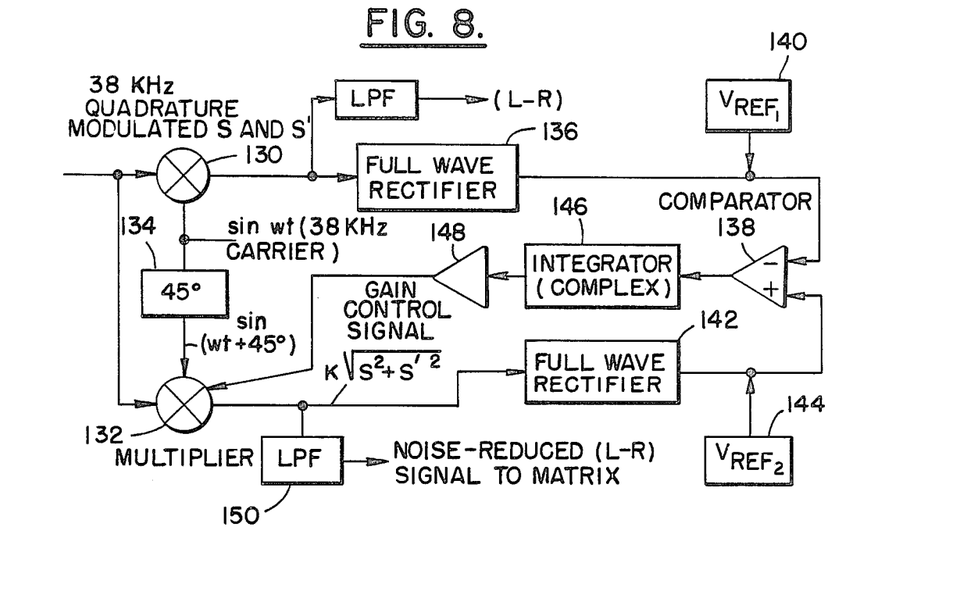
FIG. 8 is a simplified block diagram of an improved adaptive expander according to the invention.

Referring now to FIG. 8, there is shown a block diagram of the portion of an FM receiver corresponding to that shown in FIG. 7, but which includes a balanced 3-port multiplier for effecting simultaneous demodulation and adaptive expansion for producing a noise-reduced difference signal for application to the dematrixer. As in the system of FIG. 7, the bandpassed 38 KHz quadrature-modulated S and S' signals are applied to a conventional multiplier 130 and also to one input of a balanced 3-port multiplier 132. The pilot signal is derived in the usual way by known means (not shown) and used to regenerate and apply a reference 38 KHz carrier to the second port of multiplier 130. As in the system of FIG. 7, the demodulated difference signal S produced at the output of multiplier 130 is full-wave rectified, in a rectifier 136, the output of which has a level proportional to the amplitude of the difference signal S. This signal is superimposd on a reference voltage level established by a settable device 140 labeled $V_{ref.1}$, and applied to a first input of a comparator 138.

Reverting to multiplier 132, the phase of the reference carrier is shifted by 45° by a suitable phase-shift device 134 and applied to a second input port of the multiplier, causing it to function as a quadrature demodulator having a decoding axis at 45° to the carrier axes of sin ωt or cos ωt, so as to recover the signal $\sqrt{S^2+S'^2}$. This signal is applied to a gain control signal generating circuit which includes a full-wave rectifier 142 for producing a D.C. output signal having a level proportional to the amplitude of $\sqrt{S^2+S'^2}$ and which substantially follows dynamic variations of this signal. This signal has its level adjusted by a D.C. voltage from a settable reference voltage device 144, labeled $V_{ref.2}$, and is then applied as a second input to comparator 138.

Any output signal from comparator 138 representing a difference in the amplitude of the two applied signals (after taking into account the reference voltage levels established by elements 140 and 144) is applied to an integrator 146, preferably of the complex type described earlier, and the resulting output signal is amplified by a suitable amplifier 148 to produce a gain control signal which is applied to the third input port of multiplier 132. Since the signal $\sqrt{S^2+S'^2}$ is within the gain-feedback loop of the expander, the gain of multiplier 132 is adjusted to produce a noise-reduced S signal simultaneously with the demodulation. That is, the gain control signal produced by the feedback loop applies a gain factor k to the signal $\sqrt{S^2+S'^2}$ to cause the output signal from the multiplier to have an amplitude equal to S. The expanded demodulated signal is low pass filtered by a filter 150 to remove unwanted modulation products, and then applied to the usual dematrixer. It will be observed that the use of the 3-port multiplier not only eliminates the need for a separate variable gain element (as required in the system of FIG. 7) but also, by virtue of quadrature decoding, eliminates the adder.

Just as the circuit of FIG. 3 achieved the modulation/compression function with a single multiplying circuit, the demodulation/expansion process can also be performed by multiplexing a single 3-port multiplier at an appropriate rate. This alternative embodiment, shown in FIG. 9, includes a multiplier 160 having three input ports which is time division multiplexed by ganged switches S1, S2, and S3, each having a pair of contacts (a) and (b), for accomplishing demodulation of the usual difference signal S and demodulation and adaptive expansion of the compressed difference signal S'. Although the switches are depicted as single pole-double throw mechanical switches, in an actual embodiment they are electronic switches under common clock control to be switched at a frequency of the order of 114 KHz, or three times 38 KHz, the stereo difference signal suppressed carrier frequency. Normally the switching frequency, to obey Nyquist's sampling criterion would be at least twice the highest signal frequency of the transmission, which for the stereo difference frequency is 53 KHz; thus, a minimum switching rate of 106 KHz is required. However, since F.C.C. regulations allow ancillary signals on carriers at 76 KHz, and since it is important that these signals do not appear as demodulated products in the received baseband stereo difference signal, practical switching rates much higher than 114 KHz may be required. For example, there are certain advantages in using a switching frequency of 228 KHz, in that adjacent channel interference is reduced, by generating a carrier recovery signal which has no second, third or fourth harmonics of the switching frequency. On the other hand, if the (L+R) or M signal is removed before the multipliers by means of a high pass filter, switching frequencies below 106 KHz may be acceptable. With the contactors of switches S1, S2 and S3 connected to their respective (a) contacts as shown, in which position the circuit performs the function of demodulating the normal difference signal S, the sin ωt (38 KHz) reference carrier derived from the pilot signal by conventional means (not shown) is applied to one input port of multiplier 160, the 38 KHz quadrature modulated signals S and S' are applied to a second input port, and a fixed D.C. reference voltage derived from a potentiometer 162 connected to a suitable source of D.C. potential is applied to the third input port for fixing the gain of the multiplier at a prescribed point. The multiplier functions to demodulate only the unchanged difference signal S (that is, it ignores the quadrature-modulated compressed difference signal S'), the resulting signal being applied to a lowpass filter 164 which removes residual carrier and modulation components and delivers the baseband signal S.

Figure 9:
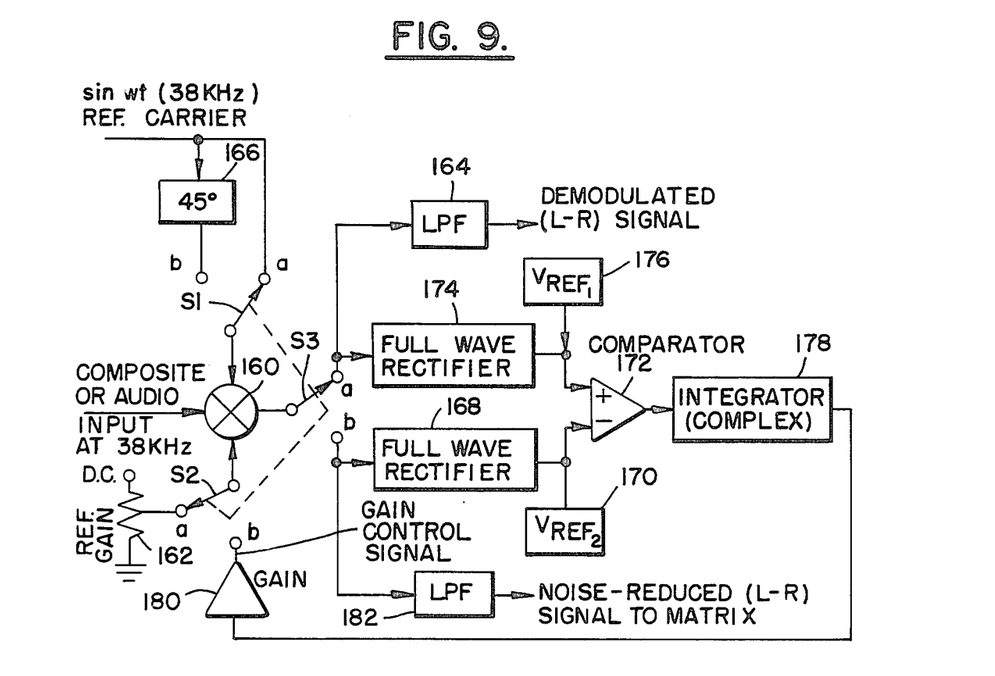
FIG. 9 is a simplified block diagram of an alternative embodiment of the invention.

When all of the switch contactors are switched to their (b) contacts, the circuit corresponds essentially to that portion of the FIG. 8 circuit which includes 3-port multiplier 132. More particularly, again the quadrature modulated S and S' signals are applied to one input to the multiplier, and the phase of the reference carrier is shifted by 45° in a conventional phase shift device 166 and applied to a second input, so as to set the decoding axis at 45° to the normal carrier axes. As in the circuit shown in FIG. 8, the output signal $\sqrt{S^2 + S'^2}$ from multiplier 160 is fed to a control voltage generator loop which includes a full-wave rectifier 168 for producing a direct voltage signal having a level proportional to the amplitude of the applied signal. The control loop further includes a settable voltage reference device 170, which may either be incorporated as part of the rectifier or inserted at some other point in the loop, for determining the "knee" of the expansion characteristic. The direct voltage output from rectifier 168, as modified by the reference voltage, is applied to one input of a comparator 172 which receives at its other input a direct voltage delivered by rectifier 174 when the contactor of switch S3 is in position (a). Any output signal from comparator 172 representing a difference in the amplitude of the two applied signals is applied to an integrator 178, preferably of the complex type described earlier. The output signal from the integrator is amplified by a suitable amplifier 180 to produce a gain control signal for controlling the gain of multiplier 160. Thus, the circuit functions in the same way as the FIG. 8 circuit to deliver a noise-reduced signal S at the output of a lowpass filter 182 connected to the output of multiplier 160. Thus it is seen that all demodulation and expansion of the received stereo difference signal for realizing the benefits of the Torick/Keller broadcasting system is accomplished with only one 3-port multiplier, resulting in a large saving in components compared to prior art stereo demodulators and expanders. As in the case of the circuit of FIG. 3, this circuit is also readily integrated.

Figure 10:
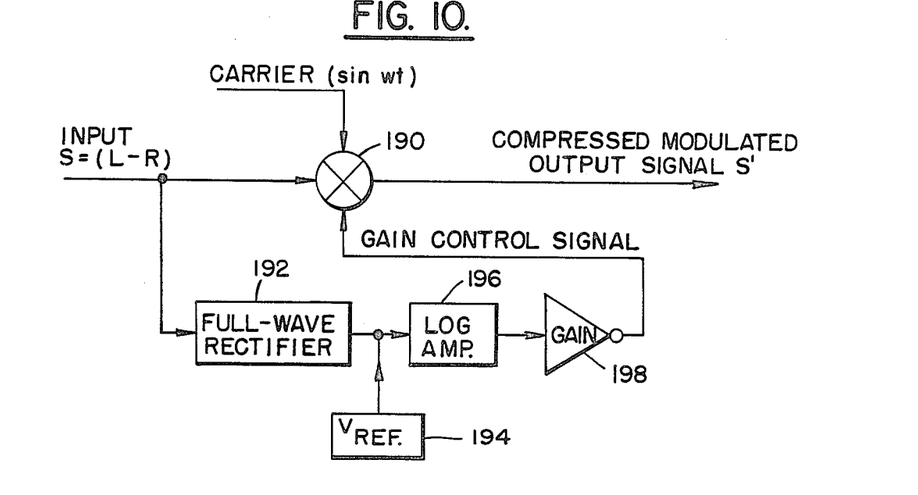
FIG. 10 is a simplified block diagram of an alternative form of compressor utilizing the invention.
Figure 11:
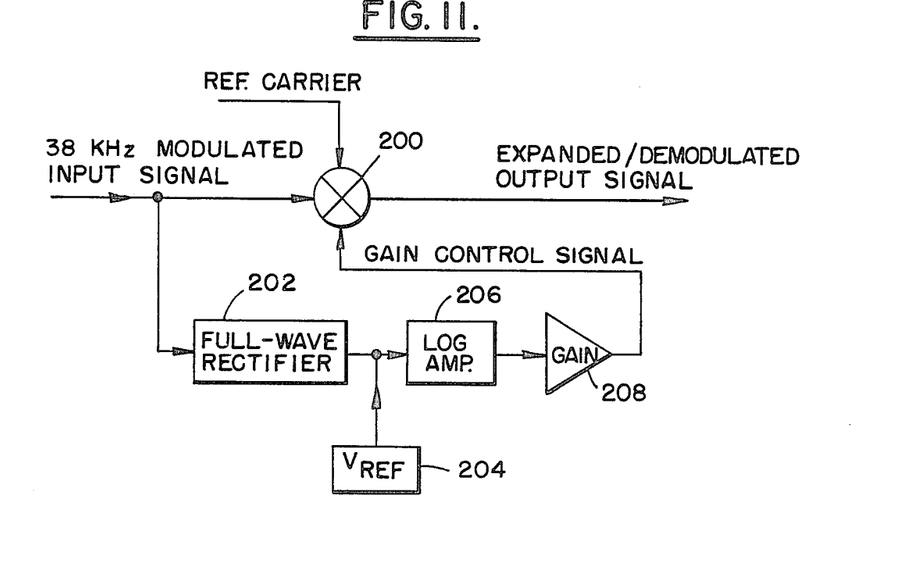
FIG. 11 is a simplified block diagram of an alternative type of expander embodying the invention.

Although the compressors utilized in the circuits of FIGS. 2 and 3 and the expanders utilized in the systems shown in FIGS. 7, 8 and 9 are all of the feedback type, it is to be understood that these embodiments are by way of example and that the advantages of the invention can also be realized with compressors and expanders of the feed-forward type shown in FIGS. 10 and 11, respectively. Referring to FIG. 10, the illustrated compressor includes a 3-port balanced multiplier 190 connected to receive the carrier signal at one input and the signal to be compressed, for example, a stereo difference signal, at a second input port. A circuit for generating a signal for controlling the gain of the multiplier includes a full-wave rectifier 192 connected to receive the input signal, a voltage reference device 194 for establishing the "knee" of the compression characteristic, a logarithmic amplifier 196 connected to receive the D.C. voltage produced by the combined action of the rectifier and voltage level setting device and a gain device 198, the output of which is applied to the third port of multiplier 190. As the amplitude of the input signal increases the level of the output of the log amp increase logarithmically. The gain device 198 is designed to cause a prescribed decrease in the level of the signal applied to it, and the multiplier is arranged so that its gain increases with increases in the level of the control voltage delivered by the gain element. The gains and offsets of the control signal generating loop and the characteristics of the multiplier circuit itself are all chosen specifically to give the desired compression characteristic to the simultaneously modulated and compressed output signal.

Referring now to FIG. 11, the feed-forward type of demodulator/expander has the same basic elements as the just-described compressor/modulator and also derives the control signal for a 3-port modulator 200 from the input to the multiplier which, in this example, is a 38 KHz carrier amplitude modulated with the compressed difference signal. The input signal is applied to one port of the multiplier and also to a full-wave rectifier 202 which produces a direct current signal the level of which increases with increases in the amplitude of the input signal. The "knee" of the expansion characteristic is established by a D.C. voltage provided by a settable voltage reference device 204, the output of which is combined with the signal delivered by the rectifier and applied to a logarithmic amplifier 206. A gain element 208 produces and applies to a third port of the multiplier a control signal which increases in level with increases in the level of the input signal. In this case, the gain of the multiplier decreases in response to increases in the level of the applied control signal according to the desired expander characteristic and produces at its output, in a single operation, the demodulated and expanded difference signal.

Figure 12:
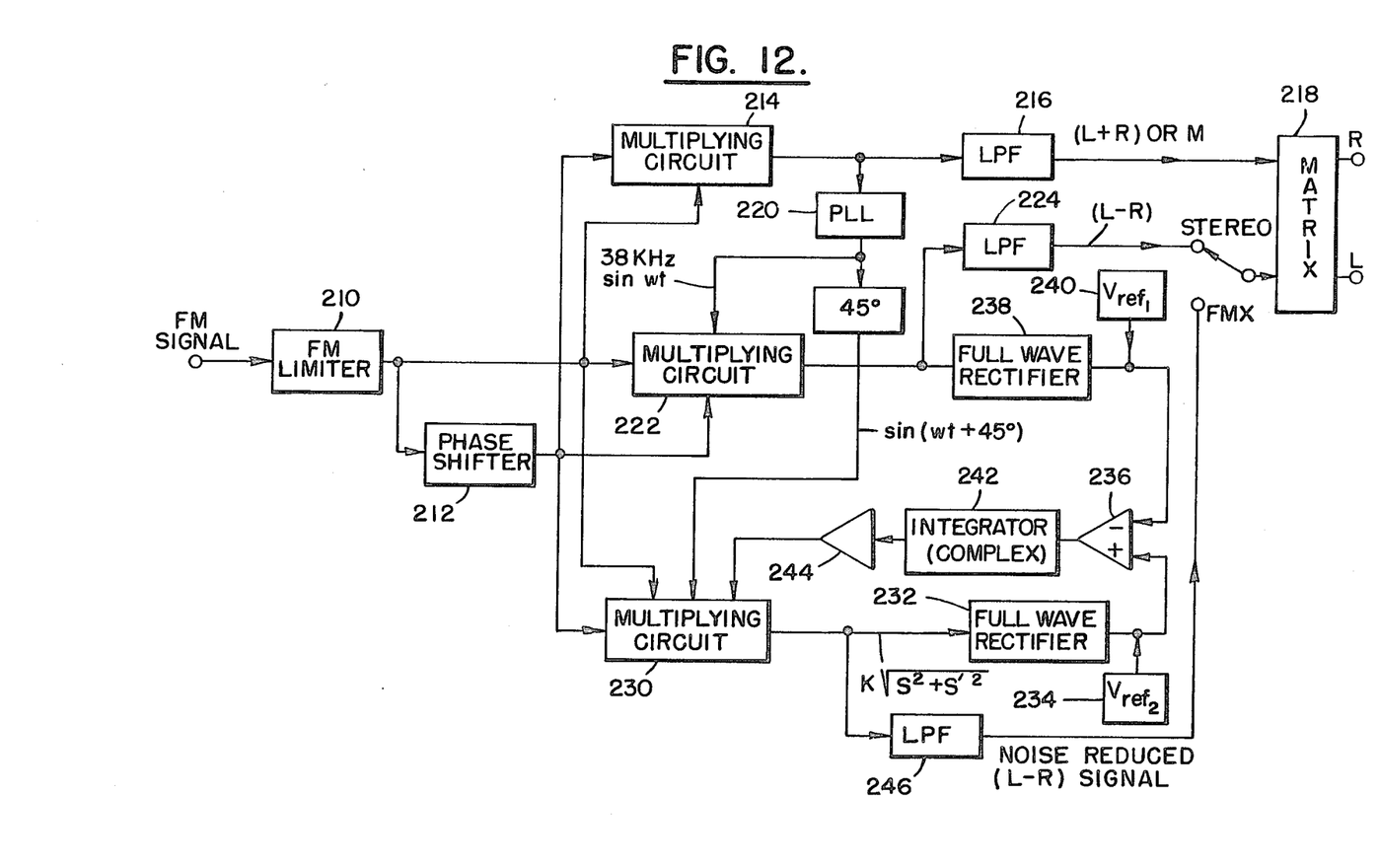
FIG. 12 is a block diagram showing the principle of the combination of the simultaneous demodulation of the FM signal directly at the output of the FM limiter with the simultaneous demodulation and expansion of the stereo difference signal.

FIG. 12 is a schematic diagram of an FM receiver in which simultaneous demodulation and expansion of the stereo difference signal is combined with simultaneous demodulation of the FM signal directly at the output of the FM limiter. This feature (to be described presently) is combined with features of a prior art FM receiver having a quadrature FM detecting circuit, in which the excess of an amplitude component of an input "FMX" signal (i.e., an FM signal containing both uncompressed and compressed versions of the stereo difference signal) is eliminated by a limiter 210 and then the "FMX" signal is inputted to a quadrature detecting circuit comprising a phase shifter 212 and a multiplier 214. Phase shifter 212 is of the type conventionally used in quadrature FM detectors which produces at its output a signal which is in quadrature to the input signal at its center frequency (the FM-IF signal frequency of 10.7 MHz) but the phase of which varies with frequency such that frequencies lower than the center frequency are delayed less than 90° and frequencies above the center frequency are delayed by more than 90°. Multiplication of the output of phase shifter 212 and of the FM input signal is performed in multiplier 214 and the output is filtered by a low pass filter 216 so as to form a stereo sum signal (L+R) for application to a matrix 218.

The normal stereo difference signal S (i.e., L−R) is derived by a demodulating circuit which comprises a phase-locked loop (PLL) circuit 220 and a three-port multiplying circuit 222. The PLL circuit 220 extracts a stereo pilot signal out of the sum signal produced by multiplier 214 and produces a subcarrier signal of 38 KHz, synchronized with the pilot signal, which is applied to one port of multiplying circuit 222; the FM signal and the output of phase shifter 212 are applied to the second and third ports, respectively. Multiplication performed by circuit 222 produces an output signal which is the product of the FM signal, the output of phase shifter 212 and a sinusoidal wave subcarrier of 38 KHz. The output of multiplying circuit 222, the conventional stereo difference signal (L−R), is low-pass filtered by a low pass filter 224 and applied to one terminal, marked "STEREO", of a switch 226 for selective application to another input to matrix 218. It will be recognized that the circuitry described thus far is a known form of FM receiver, shown, for example, in U.S. Pat. No. 4,523,329, and capable of reproducing conventional FM stereo signals.

Simultaneous demodulation and adaptive expansion of the compressed version of the stereo difference signal in combination with simultaneous demodulation of the FM signal directly at the output of FM limiter 210 is achieved by a demodulating circuit which comprises phase shifter 212, PLL 220, a phase shifter 228 arranged to shift the phase of the 38 KHz subcarrier signal from PLL 220 by 45°, a four-port multiplying circuit 230, which may have the configuration shown in FIG. 6D, and a circuit for generating a gain control signal. The $\sin(\omega t + 45°)$ subcarrier signal from the output of phase shifter 228 is applied to one port of multiplier 230, the output of phase shifter 212 and the FM signal are applied to second and third ports, respectively, and a gain control signal derived from the signal appearing at the output of the multiplier is applied to a fourth port for controlling the gain of the multiplier according to a desired expansion characteristic. Multiplication of these signals by multiplier 230 not only demodulates the FM signal, but also quadrature demodulates the stereo difference signal to recover the signal $k\sqrt{S^2+S'^2}$ and simultaneously expands this recovered signal in response to the gain control signal.

As in the system of FIG. 8, the output signal from multiplier 230 is full-wave rectified in a rectifier 232, the output of which has a level proportional to the amplitude of $\sqrt{S^2+S'^2}$. This signal is superimposed on a reference voltage level established by a settable device 234 labeled $V_{ref2}$ and applied to a first input of a comparator 236. The output signal from multiplier 222 is full-wave rectified by a rectifier 238 to produce an output signal having a level proportional to the amplitude of the difference signal S. This signal is superimposed on a reference voltage level established by a settable device 240, labeled $V_{ref1}$, and applied to the second input of comparator 236. Any output signal from comparator 236 representing a difference in the amplitudes of the two applied signals is applied to an integrator 242, preferably of the complex type described earlier, and the resulting output signal is amplified by a suitable amplifier 244 to produce a gain control signal which is applied to the fourth port of the multiplier. The gain control signal applies a gain factor K to the signal $\sqrt{S^2+S'^2}$ to cause the output signal from multiplier 230 to have an amplitude equal to S. The expanded demodulated signal is low pass filtered by a low pass filter 246 to remove unwanted modulation products, and then applied to a second contact of switch 226 marked "FMX." When the switch is in the "FMX" position, the noise-reduced difference signal (L−R) is matrixed in conventional fashion to produce separate left and right channel signals.

Although the invention has been described in the context of the 38 KHz carrier frequency and double sideband amplitude modulated suppressed carrier modulation of the current FM stereo broadcasting system, the invention is not limited to this application but is useful with other types of modulation including single sideband suppressed-carrier amplitude modulation and quadrature amplitude-modulation, suppressed-carrier (QAM). The compressor may be designed to have any desired characteristic, any "knee" and/or have the reentrant characteristic illustrated in FIG. 5. Likewise, the expander may have any desired characteristic, and/or may be, and preferably is, of the described adaptive type or of any of the embodiments described in the aforementioned U.S. Pat. No. 4,602,381. Thus, although several specific embodiments of the invention have been illustrated and described, they are to be considered as exemplary only, and such variations and modifications as will now be suggested by those skilled in the art will be understood as forming a part of the present invention insofar as they fall within the spirit and scope of the appended claims.

We claim:

1. Circuit for either simultaneously modulating and compressing or simultaneously demodulating and expanding an input signal, said circuit comprising:
   an input signal source,
   a generator of a carrier signal,
   a control signal generating means for producing a direct current gain control signal which has an amplitude related to the amplitude of said input signal according to a predetermined characteristic, and
   multiplying means consisting of a unitary three-input port multiplier device for simultaneously multiplying together said
   input signal, said carrier signal and said gain control signal and producing at its output, depending on whether said input signal is an audio frequency signal or is a carrier signal amplitude modulated with a compressed audio frequency signal, either said carrier signal modulated by said input signal compressed according to said predetermined characteristic, or said audio frequency signal expanded according to said predetermined characteristic.

2. Circuit as defined by claim 1 for modulating and simultaneously compressing an input signal, wherein
   said input signal source is a source of stereo difference signal, and
   said multiplier device is operative to multiply said stereo difference signal, said carrier signal and said gain control signal to produce at the output of said multiplier device a carrier signal amplitude-modulated with said stereo difference signal compressed according to said predetermined characteristic.

3. Circuit as defined by claim 1 for demodulating and simultaneously expanding an input signal, wherein said input signal source is a source of carrier signal of predetermined frequency amplitude-modulated with a compressed stereo difference signal, said generator is a generator of a reference carrier signal having said predetermined frequency and a predetermined phase relationship with respect to said modulated carrier signal, and said multiplier device is operative to simultaneously multiply said amplitude-modulated carrier signal, said reference carrier signal and said gain control signal and produce at the output of said multiplier said stereo difference signal expanded according to said predetermined characteristic.

4. In apparatus for receiving an FM multiplex signal including a sum signal containing summed left and right stereo signals, a stereo difference signal modulated on a first sub-carrier and said stereo difference signal compressed according to a predetermined characteristic and modulated on a second sub-carrier of the same frequency as said first sub-carrier and in quadrature therewith, circuit means for producing an expanded version of said compressed stereo difference signal comprising:

means for generating a reference carrier signal having the frequency of and a predetermined phase relationship with said second sub-carrier, control signal generator means for generating a direct current gain control signal which has an amplitude related to the amplitude of said stereo difference signal according to said predetermined characteristic, and multiplying means consisting of a unitary three-input port multiplier device for multiplying together said modulated second sub-carrier, said reference carrier signal and said gain control signal for demodulating said second sub-carrier and producing said compressed difference signal and at the same time expanding said compressed stereo difference signal according to said predetermined characteristic.

5. In a transmitter for a biphonic FM radio transmission system, apparatus comprising:

first means for combining stereophonically related audio frequency signals L and R to obtain sum and difference signals M and S respectively comprising (L+R) and (L−R), second means for compressing said difference signal S and simultaneously amplitude-modulating a first sub-carrier signal with said compressed difference signal, said second means including a unitary multiple-input port multiplier having a first input port connected to receive said difference signal S, a second input port connected to receive said first sub-carrier signal, a third input port and an output port, and control signal generating means responsive to a signal produced at the output port of said multiplier for generating and applying to the third input port of said multiplier a gain control signal which has an amplitude related to the amplitude of said difference signal S according to a predetermined compression characteristic, said multiplier being operative simultaneously to multiply the difference signal S, the first sub-carrier signal and said gain control signal for producing at the output port of said multiplier said first sub-carrier signal amplitude-modulated with said difference signal S compressed according to said predetermined compression characteristic, and third means for amplitude-modulating a second sub-carrier with said difference signal S, said third means including said multiplier and further comprising a source of reference potential, and switching means operative at a predetermined switching rate for alternately applying to respective input ports of said multiplier at said predetermined switching rate (1) a first combination of signals consisting of the first sub-carrier signal, the stereo difference signal S and said gain control signal and (2) a second combination of signals consisting of the second sub-carrier signal, the stereo difference signal S and said reference potential, for enabling said multiplier to both (a) modulate the second sub-carrier signal with the stereo difference signal S and (b) modulate the first sub-carrier signal with the stereo difference signal S compressed according to said predetermined compression characteristic.

6. Apparatus as defined in claim 5, wherein said first and second sub-carrier signals are equal frequency quadrature-related FM sub-carrier signals, and said switching rate is at least twice the highest signal frequency contained in said stereophonically related audio frequency signals L and R.

7. Apparatus as defined in claim 6, wherein the frequency of said FM sub-carrier signals is 38 KHz and said switching rate is about 114 KHz.

8. Receiver apparatus for an incoming FM signal including equal frequency quadrature-related FM signals respectively amplitude-modulated with an audio frequency stereo difference signal S and a compressed version S′ of said stereo difference signal, said apparatus comprising:

generator means for generating a reference FM sub-carrier signal having first and second phases, first demodulator means connected to receive said incoming signal and said first phase of said reference FM subcarrier signal for producing the difference signal S, and second demodulator means connected to receive said incoming signal, said second demodulator means comprising a unitary multiplier device having at least first, second and third input ports and an output port, means for applying said incoming signal to a first port of said multiplier device, means for applying said second phase of said reference FM sub-carrier signal to a second input port of said multiplier device, and control signal generating means responsive to both said demodulated difference signal S and a signal produced at the output port of said multiplier device for producing and applying to a third input port of said multiplier device a direct current gain control signal which has an amplitude related to the amplitude of said demodulated difference signal S according to a predetermined expansion characteristic, said multiplier device being operative simultaneously to multiply said incoming signal, said second phase of said reference FM sub-carrier signal and said gain control signal to produce a noise-reduced difference signal S at the output port of said multiplier device, said first demodulator means including said multiplier device and further including
a source of reference potential, and
switching means operative at a predetermined switcheing rate for alternately applying to respective input ports of said multiplier device at said predetermined switching rate, (1) a first combination of signals consisting of said second phase of said reference FM sub-carrier signal, said incoming signal and said gain control signal, and (2) a second combination of signals consisting of said first phase of said reference FM sub-carrier signal, said incoming signal and said reference potential, for enabling said multiplier device to both (a) demodulate the stereo difference signal S and (b) simultaneously demodulate the compressed version S' of the stereo difference signal and expand the demodulated signal S' according to said predetermined expansion characteristic.

9. FM receiver apparatus as defined in claim 8, wherein
said switching rate is at least twice the highest signal frequency contained in said audio frequency stereo difference signal of said incoming signal.

10. FM receiver apparatus as defined in claim 9, wherein the frequency of said FM sub-carrier signals is 38 KHz and said switching rate is about 114 KHz.

11. FM receiver apparatus as defined in claim 8, wherein said gain control signal generating means includes comparator means for dynamically comparing a signal proportional to the signal produced at the output port of said multiplying circuit against a signal proportional to said demodulated difference signal S for producing an error signal proportional to differences between said signal S and the signal produced at the output port of said multiplying circuit, and
means for processing said error signal to produce said gain control signal.

12. FM receiver apparatus as defined in claim 11, wherein said gain control signal generating means further includes first rectifier means responsive to the demodulated difference signal S for producing and applying to said comparator means a first rectified signal having a level proportional to the amplitude of and which substantially follows dynamic variations of the difference signal S, and
second rectifying means responsive to the signal produced at the output port of said multiplying circuit for producing and applying to said comparator means a second rectified signal having a level proportional to the amplitude of and which substantially follows dynamic variations of the output signal from said multiplying circuit.

13. FM receiver apparatus as defined in claim 12, wherein said means for processing said error signal includes complex integrator for modifying said gain control signal to minimize program modulated noise in spite of rapid changes in level of the first and second rectified signals applied to the comparing means.

14. In a transmitter for a biphonic FM broadcasting system, apparatus comprising:
a source of FM stereo difference signal (L−R),
first and second generators for respectively generating first and second FM sub-carrier signals,
first means for modulating said first FM sub-carrier signal with said difference signal (L−R), and
second means for modulating said second FM sub-carrier signal with said difference signal (L−R) compressed according to a predetermined compression characteristic, said second means for modulating comprising a unitary three-input multiplier connected to receive at respective input ports and for simultaneously multiplying together said difference signal (L−R), said second FM sub-carrier, and a gain control signal which has an amplitude related to the amplitude of said difference signal (L−R) according to said predetermined characteristic and producing at the output of said multiplier said second FM sub-carrier signal modulated with said difference signal compressed according to said predetermined compression characteristic,
said means for modulating said first FM sub-carrier signal including said three-input port multiplier and further comprising
a source of reference potential, and
switching means operative at a predetermined switching rate for alternately applying to said multiplier at said predetermined switching rate a first combination of signals consisting of the second FM sub-carrier signal, the stereo difference signal (L−R) and said gain control signal, and a second combination of signals consisting of the first FM sub-carrier signal, the stereo difference signal (L−R) and said reference potential, for enabling said multiplier to both (1) modulate the first FM sub-carrier signal with the stereo difference signal and (2) modulate the second FM sub-carrier signal with the stereo difference signal compressed according to said predetermined compression characteristic.

15. In an FM stereo broadcasting system for transmitting and receiving an FM multiplex signal derived from stereophonically related audio frequency signals L and R, said multiplex signal including a sum channel comprising the sum (L+R) of said L and R signals, and at least a first stereo difference channel comprising the difference (L−R) of said L and R signals compressed according to a predetermined characteristic modulated on a sub-carrier, means for developing said first stereo difference channel comprising:
a source of said stereo difference signal (L−R),
a generator of said sub-carrier signal,
means for generating a gain control signal which has an amplitude related to the amplitude of said stereo difference signal according to said predetermined characteristic, and
multiplying means consisting of a unitary three-input port multiplier connected to receive at respective input ports and for simultaneously multiplying together said stereo difference signal, said sub-carrier signal, and said gain control signal and producing at the output of said multiplier said sub-carrier signal modulated by said stereo difference signal compressed according to said predetermined characteristic.

16. Circuit as defined in claim 15, wherein
said means for generating a gain control signal is responsive to the output signal from said multiplier to produce and apply to said multiplier a direct current gain control signal for establishing a predetermined compression characteristic, thereby simulaneously to compress said stereo difference signal according to said predetermined compression characteristic and to modulate said sub-carrier signal with said compressed stereo difference signal.

17. Circuit as defined in claim 16, wherein said gain control signal generating means is responsive to the output signal from said multiplier.

18. In a stereo transmission system for generating and transmitting an FM multiplex signal including a sum signal containing summed left and right stereo signals modulated on a main carrier, a difference signal containing the difference between said left and right stereo signals, said difference signal being utilized in two difference channels, each channel utilizing one of a pair of quadrature-related 38 kHz sub-carrier signals, said stereo transmission system including first modulator means for modulating said difference signal on one of said quadrature-related sub-carrier signals and second modulator means for simulaneously compressing said difference signal and modulating the other of said sub-carrier signals with said compressed difference signal, said second modulator means comprising:

multiplying means consisting of a unitary three-input port multiplier connected to receive and for simultaneously multiplying together said difference signal, said other sub-carrier signal and a gain control signal which has an amplitude related to the amplitude of said difference signal according a predetermined compression characteristic and producing at the output of said multiplier said other sub-carrier signal modulated with said difference signal compressed according to said predetermined compression characteristic.

19. Apparatus as defined in claim 18, wherein said first modulator means includes said multiplier and further comprises:

a source of reference potential, and switching means operative at a predetermined switching rate for alternately applying to said multiplier at said predetermined switching rate a first combination of signals consisting of the said other sub-carrier signal, the said stereo difference signal, and said gain control signal and a second combination of signals consisting of said one sub-carrier signal, the said stereo difference signal and said reference potential, for enabling said multiplier to both (1) modulate said one sub-carrier signal with the stereo difference signal and (2) simultaneously compress said stereo difference signal according to said predetermined compression characteristic and modulate said other sub-carrier signal with said compressed difference signal.

20. In a stereo transmission system for generating and transmitting an FM multiplex signal derived from left and right audio frequency stereo channel signals, said multiplex signal including a sum channel containing the summed left and right stereo channel signals and first and second difference channels respectively containing the difference between said first and right stereo channel signals and the difference between said left and right stereo channel signals compressed according to a predetermined compression characteristic, means for developing said first and second difference channels comprising:

a source of difference signal containing the difference between left and right stereo channel signals, generator means for producing first and second sub-carrier signals, first modulator means for modulating said difference signal on said first sub-carrier signal, and second modulator means comprising:

multiplying means consisting of a unitary three-input port multiplier a first input port of which is connected to receive said difference signal, and a second input port of which is connected to receive said second sub-carrier signal, and control signal generating means responsive to a signal produced at the output of said multiplier for generating and applying to a third input port of said multiplier a gain control signal which has an amplitude related to the amplitude of said difference signal according to a predetermined compression characteristic, said multiplier being operative simulaneously to multiply the difference signal, the second sub-carrier signal and said gain control signal for producing at the output of said multiplier said second sub-carrier signal modulated with said difference signal compressed according to said predetermined compression characteristic.

21. Receiver apparatus for an incoming FM signal including equal frequency quadrature-related sub-carrier signals respectively amplitude-modulated with a stereo difference signal S and a compressed version S' of said stereo difference signal, said apparatus comprising:

a first phase shifter for shifting the phase of said incoming FM signal by an amount proportional to the frequency of said FM signal;

a first multiplier for multiplying said incoming FM signal and the output of said first phase shifter thereby producing a sum signal $(L+R)$;

a generator of a reference FM sub-carrier signal;

a second multiplier connected in parallel with said first multiplier for multiplying said incoming FM signal, the output of said first phase shifter, and the output of said generator thereby producing a difference signal $(L-R)$;

a second phase shifter for shifting the phase of the output of said generator by 45°; and a third multiplier connected in parallel with said first and second multipliers, for multiplying said incoming FM signal, the output of said first phase shifter, the output of said second phase shifter, and a gain control signal which has an amplitude related to the amplitude of said incoming FM signal according to a predetermined expansion characteristic thereby producing a noise-reduced difference signal $(L-R)$.

22. Receiver apparatus as defined in claim 21, wherein said first phase shifter shifts the phase by 90° of a center FM frequency.

23. Receiver apparatus as defined in claim 21, wherein said generator is a phase-locked loop connected to the output of said first multiplier.

24. Receiver apparatus as defined in claim 21, further comprising means for generating said gain control signal, said means for generating including means for dynamically comparing the outputs of said second and third multipliers for producing an error signal having a level proportional to differences between said difference signal $(L-R)$ and the signal produced at the output of said third multiplier, and means for processing said error to produce and apply said gain control signal to said third multiplier.

25. Receiver apparatus as defined in claim 24, wherein said gain control signal generating means further comprises first rectifier means connected to the output of said second multiplier for producing and applying to said comparator means a first rectified signal having a level proportional to and which substantially follows dynamic variations in the difference signal (L−R), and second rectifier means connected to the output of said third multiplier for producing and applying to said comparator means a second rectified signal having a level proportional to and which substantially follows dynamic variations in the output from said third multiplier.

26. Receiver apparatus as defined in claim 21, further comprising
a matrix circuit,
means connecting the output of said first multiplier to said matrix circuit, and
switch means for selectively connecting the outputs of either said second or said third multiplier to said matrix circuit,
said matrix for separating left (L) and right (R) signals.

27. In the receiver of a stereo transmission system for transmitting an FM multiplex signal derived from left and right stereo signals, said multiplex signal including a sum signal containing the summed left and right stereo signals and first and second difference signals respectively containing the difference between said left and right stereo signals modulated on a first sub-carrier and said difference between said left and right stereo signals compressed according to a predetermined characteristic modulated on a second sub-carrier, means for demodulating and expanding the compressed difference signal modulated on said second sub-carrier comprising:

means for generating a reference carrier signal having the same frequency as, and a predetermined phase relationship with respect to, said second sub-carrier, control signal generator means for producing a gain control signal which has an amplitude related to the amplitude of said stereo difference signal according to a predetermined characteristic, and multiplying means consisting of a unitary three-input port multiplier connected to receive and for simulaneously multiplying together said modulated second sub-carrier, said reference carrier signal and said gain control signal and producing at its output said stereo difference signal expanded according to said predetermined characteristic.

* * * * *